United States Patent
Thong et al.

(10) Patent No.: US 11,348,277 B2
(45) Date of Patent: May 31, 2022

(54) APPARATUS AND METHOD FOR ESTIMATING CAMERA ORIENTATION RELATIVE TO GROUND SURFACE

(71) Applicant: Hong Kong Applied Science and Technology Research Institute Company Limited, Hong Kong (HK)

(72) Inventors: Wang Kit Wilson Thong, Hong Kong (HK); Jihui Zhang, Hong Kong (HK); Man Wai Kwan, Hong Kong (HK); Yiu Man Lam, Hong Kong (HK); Cheng Hsiung Liu, Hong Kong (HK); Jiaxin Yan, Hong Kong (HK); Zhuobin Lin, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 175 days.

(21) Appl. No.: 16/992,088

(22) Filed: Aug. 12, 2020

(65) Prior Publication Data

US 2022/0051429 A1 Feb. 17, 2022

(51) Int. Cl.
*G06T 7/73* (2017.01)
*G06T 1/00* (2006.01)
*B60R 1/00* (2022.01)

(52) U.S. Cl.
CPC ............. *G06T 7/73* (2017.01); *B60R 1/00* (2013.01); *G06T 1/0014* (2013.01);
(Continued)

(58) Field of Classification Search
CPC .... G06T 7/13; G06T 7/60; G06T 7/70; G06T 7/73; G06T 2207/30244;
(Continued)

(56) References Cited

U.S. PATENT DOCUMENTS

| 8,130,244 B2 | 3/2012 | Cooper | 345/633 |
| 9,361,688 B2 | 6/2016 | Chao et al. | G06T 7/0018 |

(Continued)

FOREIGN PATENT DOCUMENTS

| CN | 102037735 A | 4/2011 | H04N 13/00 |
| CN | 102395997 A | 3/2012 | G06T 7/00 |

(Continued)

OTHER PUBLICATIONS

International Search Report of corresponding PCT Patent Application No. PCT/CN2020/110626 dated May 10, 2021.
(Continued)

*Primary Examiner* — Andrew W Johns
(74) *Attorney, Agent, or Firm* — Idea Intellectual Limited; Margaret A. Burke; Sam T. Yip

(57) ABSTRACT

A method for estimating camera orientation relative to a ground surface. Line segments are detected from an image captured by a camera. A first virtual cube having three orthogonal vanishing points with a random 3D orientation is superimposed on to the image. The line segments of the image are classified grouped into 3D-directional groups. A second virtual cube is superimposed on to the image with an initial 3D orientation. An optimal 3D orientation of the second virtual cube is computed by iteratively changing the 3D orientation of the second virtual cube and measuring perpendicular distances of the three orthogonal vanishing points to the three line segment groups in each iteration starting with the initial 3D orientation, wherein the optimal 3D orientation of the second virtual cube being one that provides shortest perpendicular distances. Co-variances of the orthogonal vanishing points of the second virtual cube at the optimal orientation are computed. Ground orientation is computed from the second virtual cube at the optimal orientation.

15 Claims, 12 Drawing Sheets

(52) U.S. Cl.
CPC ............... *B60R 2300/402* (2013.01); *G06T 2207/30244* (2013.01); *G06T 2207/30252* (2013.01)

(58) Field of Classification Search
CPC ............ G06T 2207/30252; G06K 9/00; G06V 20/56; G06V 20/58; G06V 20/582; G06V 20/584; G06V 20/586; G06V 20/588; B60R 1/00; B60R 1/22; B60R 1/23; B60R 1/24; B60R 2300/30
See application file for complete search history.

(56) References Cited

U.S. PATENT DOCUMENTS

| | | | | |
|---|---|---|---|---|
| 2010/0208057 | A1* | 8/2010 | Meier et al. ............ | G06T 15/00 345/173 |
| 2012/0249807 | A1 | 10/2012 | Sugden ...................... | 348/207.1 |
| 2015/0063684 | A1* | 3/2015 | Taylor et al. ........... | G06T 7/536 382/154 |
| 2015/0178573 | A1* | 6/2015 | Viswanath et al. .. | G06V 20/588 382/103 |
| 2020/0005490 | A1* | 1/2020 | Paik et al. .............. | G06T 7/536 |

FOREIGN PATENT DOCUMENTS

| | | | | |
|---|---|---|---|---|
| CN | 103718213 | A | 4/2014 | ............... G06T 7/00 |
| CN | 110176038 | A | 8/2019 | ............... G06T 7/80 |
| CN | 111336951 | A | 6/2020 | ............. G01B 11/26 |

OTHER PUBLICATIONS

Richard Hartley et al., "Multiple View Geometry in computer vision", Cambridge University Press, 2003.

Shinya Sumikura et. al., "OpenVSLAM: A Versatile Visual SLAM Framework", Proceedings of the 27th ACM International Conference on Multimedia, 2019, p. 2292-2295.

Faraz M. Mirzaei et al., "Optimal Estimation of Vanishing Points in a Manhattan World", IEEE International Conference on Computer Vision, 2011, p. 2454-2461.

Stella X. Yu et. al., "Inferring Spatial Layout from a Single Image via Depth-Ordered Grouping", 2008 IEEE Computer Society Conference on Computer Vision and Pattern Recognition Workshops, 2008, p. 1-7.

Timothy Barfoot et. al., "Pose estimation using linearized rotations and quaternion algebra", Acta Astronautica, 2011 p. 101-112.

Oren Freifeld, "Methods in Computer Vision: Introduction to Projective Geometry and Camera Geometry", Computer Science, Ben-Gurion University, 2017, p. 1-77.

Anton HJ de Ruiter, "Quadratically Constrained Least Squares with Aerospace Applications" Journal of Guidance, Control, and Dynamics, 2016, p. 487-497.

Canny Edge Detection, p. 1-4. http://fourier.eng.hmc.edu/e161/lectures/canny/node1.html, (dated Aug. 13, 2020).

Statistical Hough Transform, p. 12-15. https://docs.opencv.org/3.4/dd/d1a/group__imgproc__feature.html, (dated Aug. 20, 2020).

Camera calibration, p. 1-4. https://docs.opencv.org/master/dc/dbb/tutorial_py_calibration.html, (dated Aug. 13, 2020).

Kris Kitani, "Camera matrix", 16-385 Computer Vision Carnegie Mellon University, p. 1-38.

\* cited by examiner superimposing a virtual cube on to image / video frame $v_d^*$ closest to $l_{d_i}$ orthogonal on $\omega$ v on l

APPARATUS AND METHOD FOR ESTIMATING CAMERA ORIENTATION RELATIVE TO GROUND SURFACE

FIELD OF THE INVENTION

The present invention generally relates to the field of estimating camera orientation relative to a ground surface. More specifically, the present invention relates to techniques of estimating camera orientation automatically by analyzing a sense structure through leveraging properties of orthogonal vanishing points.

BACKGROUND OF THE INVENTION

Machine vision has gained much attentions in commercial and industrial use, such as imaging-based analysis for production and logistic automation. In many machine vision-based applications, camera orientation plays an important role; i.e. it is needed in order to obtain real metric units in three-dimensional (3D) space from measurements on 2D images or video frames. For example, in vehicle guidance, lane departure detection that detects when the vehicle moves away from lane markers on ground requires the knowledge of camera orientation with respect to the ground plane. Camera orientation, in particular its pitch and row angle, can be made known by a manual calibration procedure after it is mounted on the vehicle. However, for a fleet of identical vehicles, such as a fleet of automatic guided vehicles (AGV) in a factory, such repetitive manual calibration on every AGV is troublesome and error prone. Moreover, camera orientation often drifts after extended period of time of use from hard braking, sudden accelerations, inadvertent camera movements, etc.

It is possible to estimated camera orientation from a single image. For example, where the ground at infinitely far is clearly visible, its vanishing line gives indication of the camera's orientation relative to the ground. However, in many practical circumstances where there is no vertical structure in the captured image, it is impossible to obtain vertical vanishing points to estimate the ground plane. Accordingly, there is a need in the art of a new approach for estimating camera orientation that can address the shortcomings in the estimation approach that depends on vertical vanishing points.

SUMMARY OF THE INVENTION

The present invention provides a method and an apparatus for estimating camera orientation relative to a ground surface. In accordance to various embodiments of the present invention, the method includes the steps as follows. A first image of a scene before a front-facing camera is captured and recorded. A plurality of line segments are detected from the first image. A first virtual cube having three orthogonal vanishing points in a random or best-guess 3D orientation is superimposed on to the first image. An orthogonal direction classifier classifies the line segments of the first image and groups them into first, second, and third 3D-directional groups by comparing the perpendicular distances between each of the three orthogonal vanishing points of the first virtual cube to each of the detected line segments, and determining the group of which the line segment belongs to according to the shortest of the three perpendicular distances. A second virtual cube having three orthogonal vanishing points is superimposed on to the first image, wherein the second virtual cube is in an initial 3D orientation of that of the first virtual cube represented by an initial rotation matrix $R_0$. An optimal orientation of the second virtual cube with respect to the grouped line segments is computed iteratively by changing the 3D orientation of the second virtual cube and computing the perpendicular distances of the three orthogonal vanishing points to the three line segment groups in each iteration starting with the initial rotation matrix $R_0$; wherein the optimal orientation of the second virtual cube is one that provides the shortest perpendicular distances. Co-variances of the three orthogonal vanishing points of the second virtual cube at the optimal orientation are computed by the computer processor. Ground orientation is computed from one of the three orthogonal vanishing points of the second virtual cube at the optimal orientation. The process repeats in subsequent N images, each with a different random or best-guess 3D orientation of the first virtual cube. A most accurate ground plane is determined by selecting the ground orientation having the least estimation error in response to the co-variances.

In one embodiment, the optimal orientation of the second virtual cube in the first image is used to compute a ground plane on a second image following the first image; and the resulting rotation matrix $R^*$ representing the optimal orientation of the second virtual cube is used to compute a ground normal vector n of the ground orientation as $n=R^*[0,0,1]^T$.

In accordance to an application of the present invention, a method for guiding a self-driven vehicle having a front-facing camera includes executing the method for estimating camera orientation of the front-facing camera in accordance to the various embodiments of the present invention. Motions of the self-driven vehicle is determined based on the estimated camera orientation.

In accordance to another application of the present invention, a remote processing server for estimating camera orientation of a front-facing camera of a machine-vision enabled autonomous guided vehicle (AGV) is provided. The remote processing server is in data communication with the AGV and configured to receive a video feeds captured by the front-facing camera, so as to execute a method for estimating front-facing camera's orientation in accordance to the various embodiments of the present invention.

The advantages of the present invention include: (1) that in the estimation of the ground plane, any one of the X, Y, and Z 3D plane line segment groups detected and classified can be empty; (2) that the core computation in accordance to the various embodiments of the present invention is properly established on a least square optimization approach, enabling the error uncertainty on camera orientation to be computed; (3) that in general, it is difficult to solve quadratic least square minimization problem with six quadratic equality constraints, but the present invention provides a solution to circumvent the quadratic equality constraints by rotation; and (4) enabling the automation of camera orientation estimation in machine-vision applications, thereby avoiding repetitive and periodic manual calibration to camera orientation.

BRIEF DESCRIPTION OF THE DRAWINGS

Embodiments of the invention are described in more details hereinafter with reference to the drawings, in which.

DETAILED DESCRIPTION

In the following description, methods and apparatuses for estimating camera orientation relative to a ground plane by leveraging properties of orthogonal vanishing points, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, 2D and 3D spatial geometry, such as points and lines as perceived by machine vision are represented in projective space coordinates. Definitions for mathematical notations in the present disclosure are listed as follows:

A point $p$ in a two-dimensional projective space $\mathbb{P}^2$ is represented as three-vector $\vec{p}=(u, v, k)$, and its coordinate in a two-dimensional Euclidean space $\mathbb{E}^2$ is $$\left(\frac{u}{k}, \frac{v}{k}\right);$$

A line $l$ in $\mathbb{P}^2$ is represented as three-vector $\vec{l}=(a, b, c)$, and its slope and y-intercept in $\mathbb{E}^2$ is respectively $$-\frac{a}{b} \text{ and } -\frac{c}{b};$$

A point $p$ is on a line $l$ in $\mathbb{P}^2$ if and only if $p^\tau l=0$ because $au+bv+ck=0$ which is a line equation;

$a^\tau$ represents transpose of a, and $a^\tau b$ represents dot product between two vectors a and b.

Projective transformation H in $\mathbb{P}^2$ is a 3×3 matrix. It transforms a point in $\mathbb{P}^2$ from p to p'=Hp.

If H in $\mathbb{P}^2$ transforms point from p to p'=Hp, it transforms line from l to $l'=H^{-\tau}l$.

$A^{-\tau}$ represents transpose of matrix $A^{-1}$, and $A^{-1}$ represents inverse of matrix A;

A point in three-dimensional $\mathbb{E}^3$ is P=(X, Y, Z). Under a pinhole camera model, an image captured by a pinhole camera is modeled as a point p=KP in two-dimensional $\mathbb{P}^2$, where K is a projective transformation in $\mathbb{P}^2$.

K is also known as camera calibrated (or intrinsic) matrix, and it encodes camera's focal length f and principal point $(p_x, p_y)$ $$K = \begin{bmatrix} f & 0 & p_x \\ 0 & f & p_y \\ 0 & 0 & 1 \end{bmatrix}$$

such that point P=(X, Y, Z) in $\mathbb{E}^3$ is imaged as point $$p = \left(f\frac{X}{Z} + p_x, f\frac{Y}{Z} + p_y, 1\right) \text{ in } \mathbb{P}^2;$$

and

A camera calibrated matrix K can be found by some manual calibration procedure.

Figure 1:
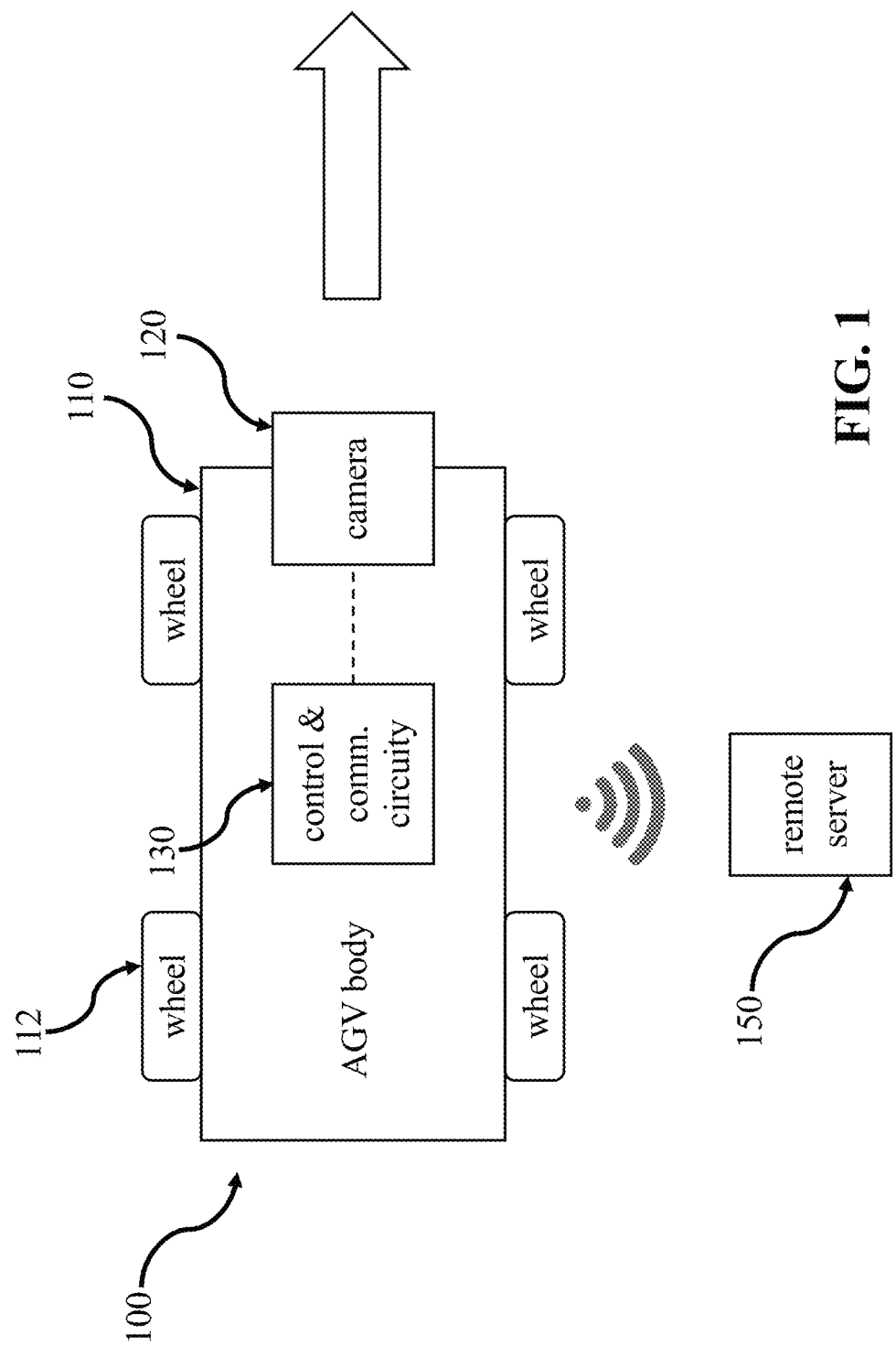
FIG. 1 depicts a schematic diagram of an exemplary embodiment of an autonomous guided vehicle (AGV) in communication with a remote processing server.

Referring to FIG. 1. The AGV 100 includes a vehicle body 110, a front-facing camera 120, and a control and communication circuitry 130 disposed in the body 110. The body 110 has a moving mechanism such as wheels 112 to go forward along arrow. The front-facing camera 120 is installed at the front side of the body 110, so as to capture a scene in front of the AGV 100 and record it into a video file/data stream. The control and communication circuitry 130 is electrically coupled with the front-facing camera 120 and configured to receive the video file/data stream from the front-facing camera 120. The control and communication circuitry 130 is in communication with the remote processing server 150 via a wireless link for uploading the video file/data stream to and downloading instructions from the remote processing server 150. Herein, the instructions include control commands for AGV movements or actions, such as going straight, turning right/left, return to charging station, shutting down, etc. The remote processing server 150 is configured to execute the AGV's machine vision application in processing the video file/data stream. In one embodiment, a group of multiple AGVs 100 is arranged in a factory, warehouse, or distribution center and the remote processing server 150 is responsible to coordinate the group to perform automated large-scope operations such as transporting product parts in a production assembly and routing goods and packages for delivery.

Figure 2:
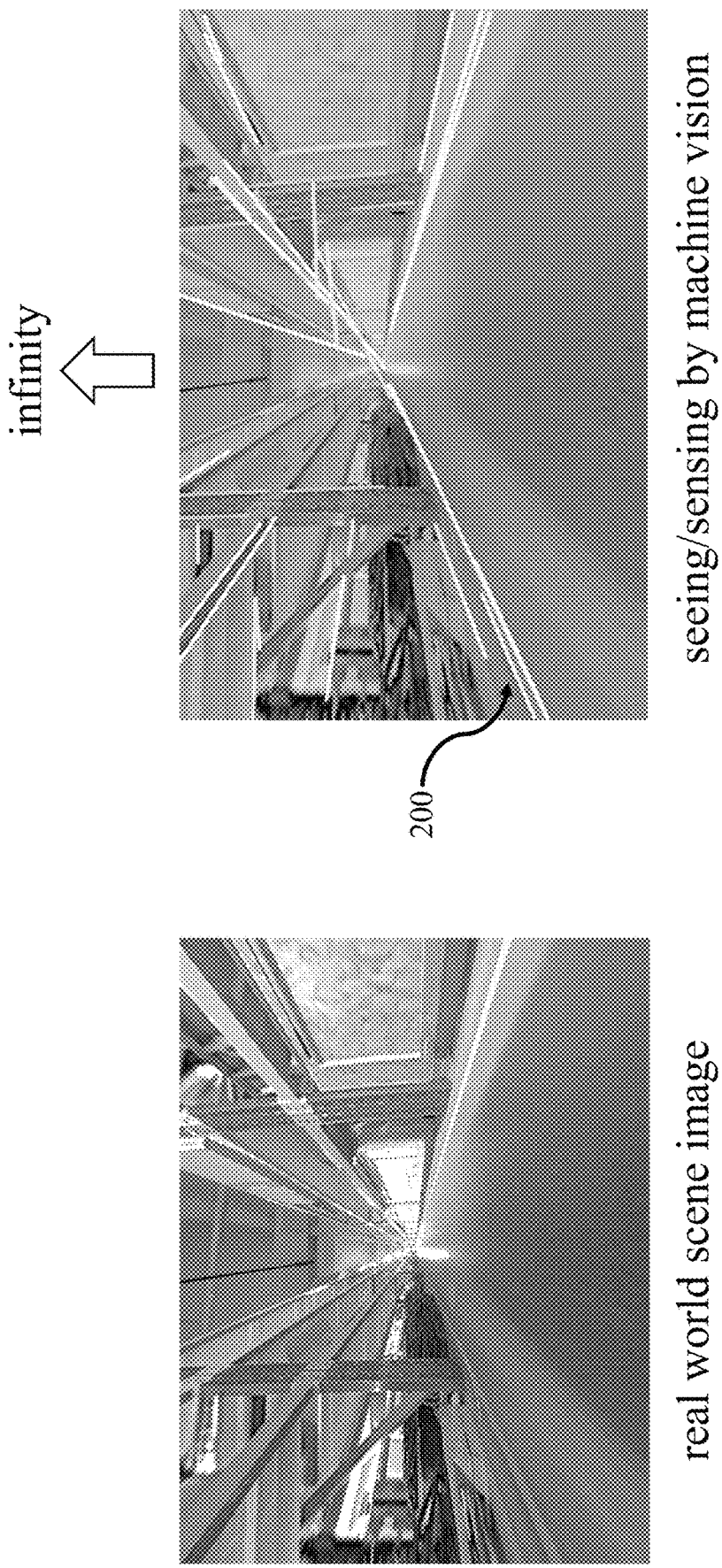
FIG. 2 shows a real-world scene image and what a machine-vision application sees/senses.

In practical cases, during operation of AGVs 100, certain conditions encountered may result in computational problems that cause the AGVs 100 unable to function. For example, as shown in FIG. 2, the left image is a real-world scene image and the right image is what the machine vision application implemented in one of the AGVs 100 sees/ senses, and the difference therebetween is that the right one shows line segments 200 detected from the real-world scene image. To estimate camera orientation, either a Z-plane vanishing point (VP) or a ground plane is typically necessary. However, in the right image, a Z-plane VP is very close to infinity because the Z-direction line segments are almost parallel with each other. Under such condition, it is difficult to apply Z-plane VP estimation to the front-facing camera.

Figure 3:
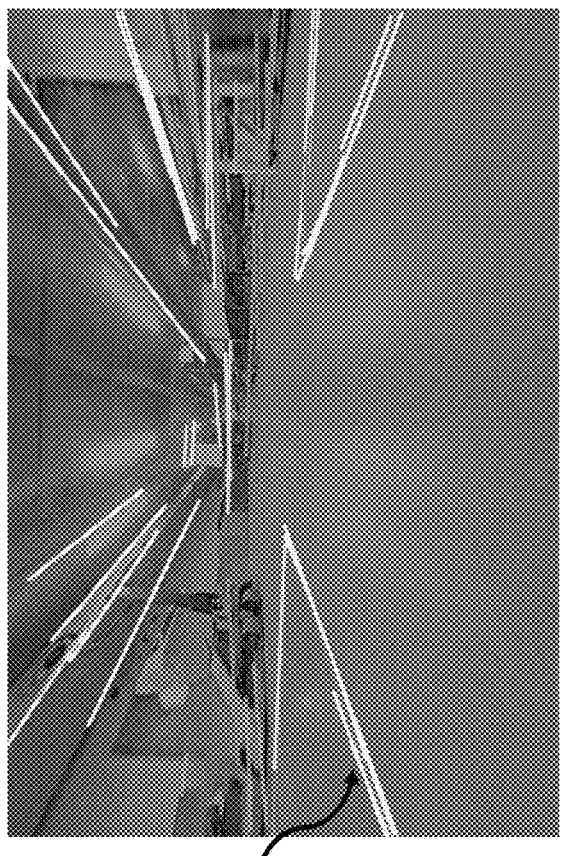
FIG. 3 shows another real-world scene image and what a machine-vision application see/senses.
Figure 3:
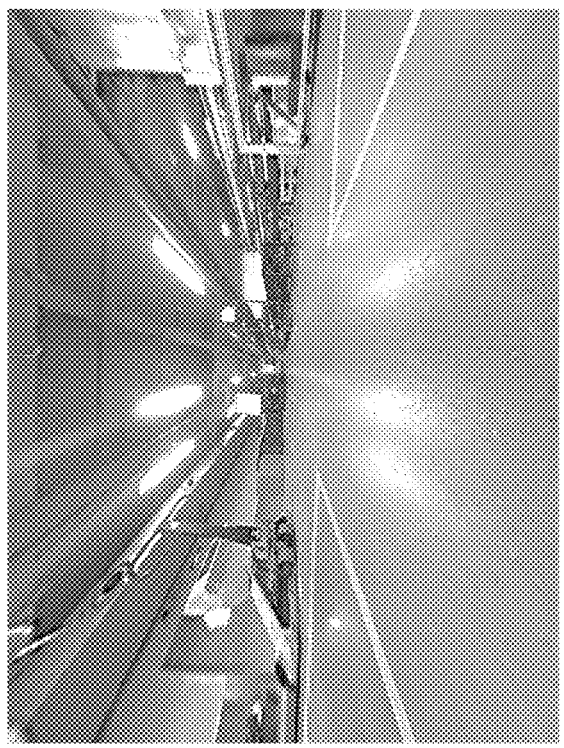

Further, as shown in FIG. 3, the left image is a real-world scene image and the right image is what the machine vision application implemented in one of the AGVs 100 sees/senses, and a difference therebetween is the right one shows line segments 200 detected from the real-world scene image. It is noticed that no Z-direction line segment is detected from the real world scene image. In this regard, even though a ground plane in the real-world scene image is clearly visible for human sense, the ground plane cannot be estimated by the machine vision application due to no line segment going through a Z-plane VP. That is, it is almost impossible to estimate an object ground plane when there is no vertical structure in the real world scene image.

Figure 4:
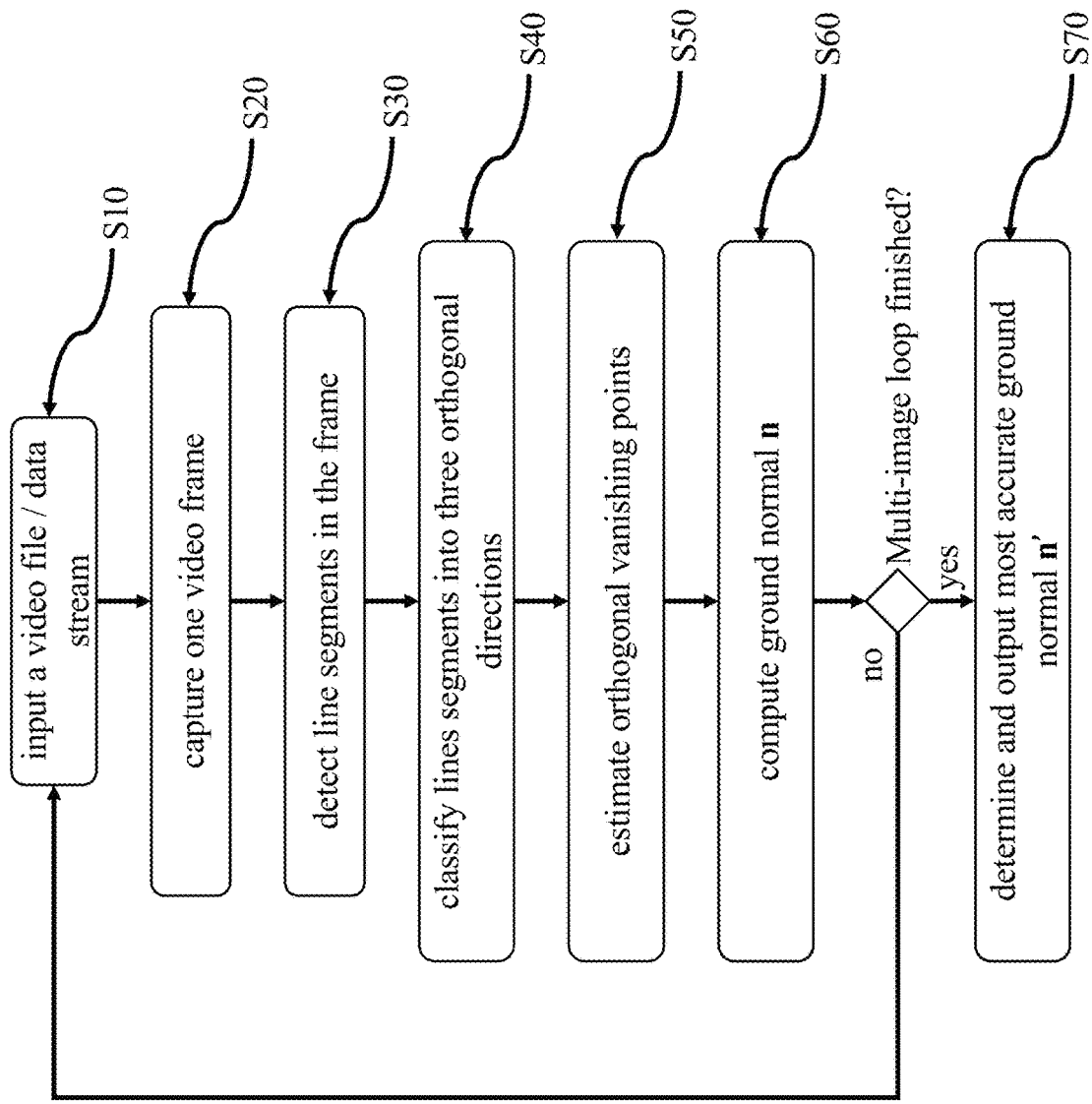
FIG. 4 depicts a flowchart of a method for estimating camera orientation according to various embodiments of the present invention.

Referring to the flowchart depicted in FIG. 4, a method for estimating camera orientation is provided to address the issue of missing Z-direction line segment in accordance to one embodiment of the present invention. The method includes steps S10-S60, which may be adopted by the machine vision application implemented by specific configurations of the AVG 100 and/or the remote processing server 150 as shown in FIG. 1.

In the step S10, a video file/data stream is produced by the AVG 100's front-facing camera 120 in capturing a real world scene before it and transmitted to the remote processing server 150 via the wireless communication. The video file/data stream contains a plurality of video frames of continuous images.

In the step S20, one video frame/image is extracted from the video file/data stream by the remote processing server 150. The video frame/image is static and reflects the real-world scene (i.e. the left image in FIG. 2 or FIG. 3).

In the step S30, detection of line segments in the video frame/image is performed by the remote processing server 150, such that line segments are generated on the video frame/image (i.e. the right image in FIG. 2 or FIG. 3). In one embodiment, the generation of the line segments applies Canny edge detection and Statistical Hough transform. More specifically, the video frame/image in RGB setting is converted into a 2D array containing only zeros and ones and then Canny edge detection is applied to the 2D array. Thereafter, line segments are detected from the 2D array by using statistical Hough transform, so as to obtain the locations where the line segments are on the video frame/image.

Figure 5:
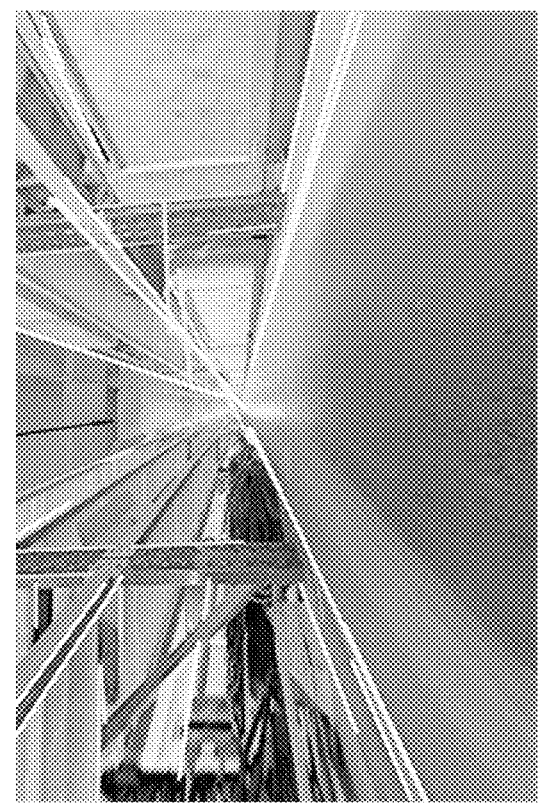
FIG. 5 shows a video frame/image with line segment indicators before and after line segment classification and grouping according to various embodiments of the present invention.
Figure 5:
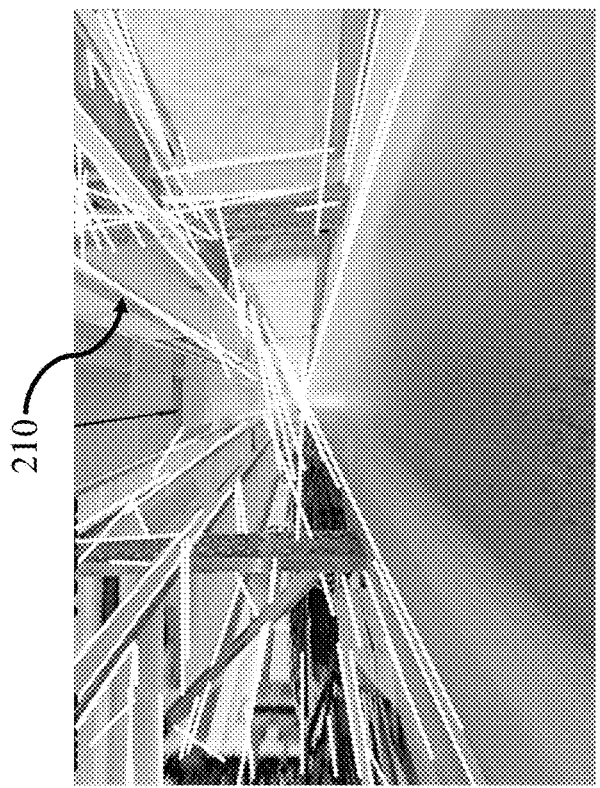

In step S40, the line segments detected in the step S30 are classified and grouped into three orthogonal directions, for example, the X, Y and Z directions. FIG. 5 shows a video frame/image with line segment indicators before and after line segment classification and grouping. The left image shows detected many line segments 210 extending to many different directions before classification and grouping. The right shows only those line segments that are classified and grouped.

In the present disclosure, definition for X, Y, and Z directions is that the X, Y, Z directions are orthogonal in 3D space and satisfy: X·Y=0; Y·Z=0; and Z·X=0. Further, the points at infinity in 3D space along X, Y, and Z directions are captured by a camera with K onto a 2D object image at image locations known as VPs and denoted by $v_x$, $v_y$, $v_z$, hereafter. They are also "orthogonal with respect to $\omega$" on an object image such that $v_z^\tau \omega v_y=0$; $v_y^\tau \omega v_x=0$; and $v_x^\tau \omega v_z=0$, where $\omega=K^{-\tau}K^{-1}$, which is known as "image of absolute conic", and K refers to the aforementioned definition of the camera calibrated matrix.

Figure 6B:
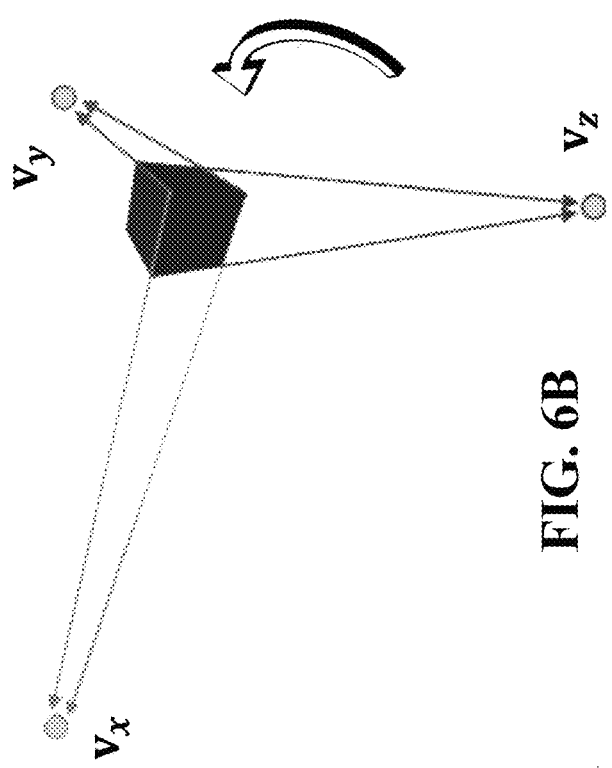
FIGS. 6A-6C illustrate a virtual cube having three vanishing points with rotating.
Figure 6C:
Figure 6A:
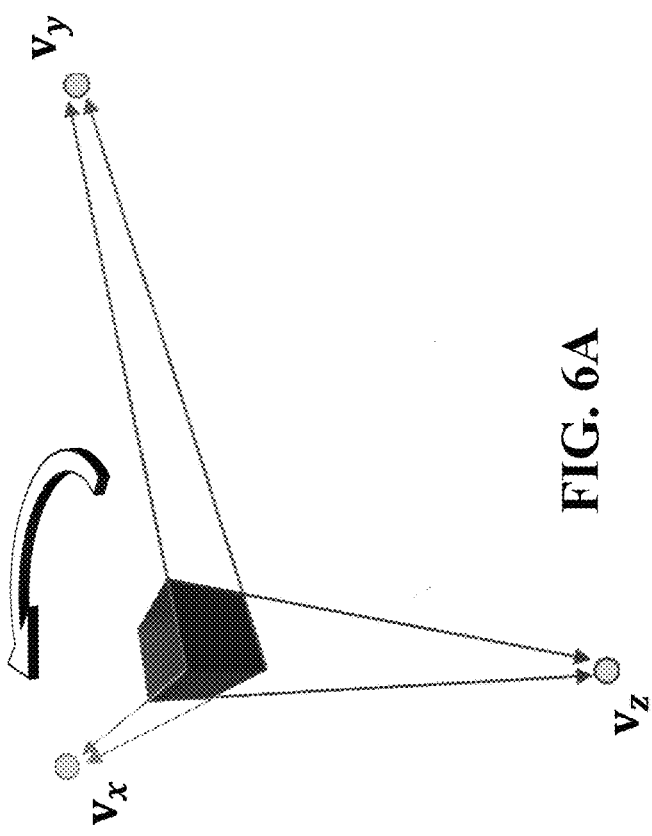

At the beginning of the line segment classification, it is assumed a virtual cube with an initial orientation in 3D space as shown in FIG. 6A, in which the virtual cube defines three group of edges in X, Y, and Z directions, respectively. The initial orientation can be randomly selected or a best-guess orientation based on the last known position and orientation of the camera. Each pair of the edges of the virtual cube in each group is pointing to one of the orthogonal directions X, Y, and Z in 3D space, and as the edges extend along the X, Y, and Z directions, they converge at infinitely far and vanish at points $v_x$, $v_y$, $v_z$ in an object image, respectively. The virtual cube may rotate about any 3D axis. For example, FIG. 6B shows that the virtual cube rotates leftward, and FIG. 6C shows that it rotates downward.

Figure 7:
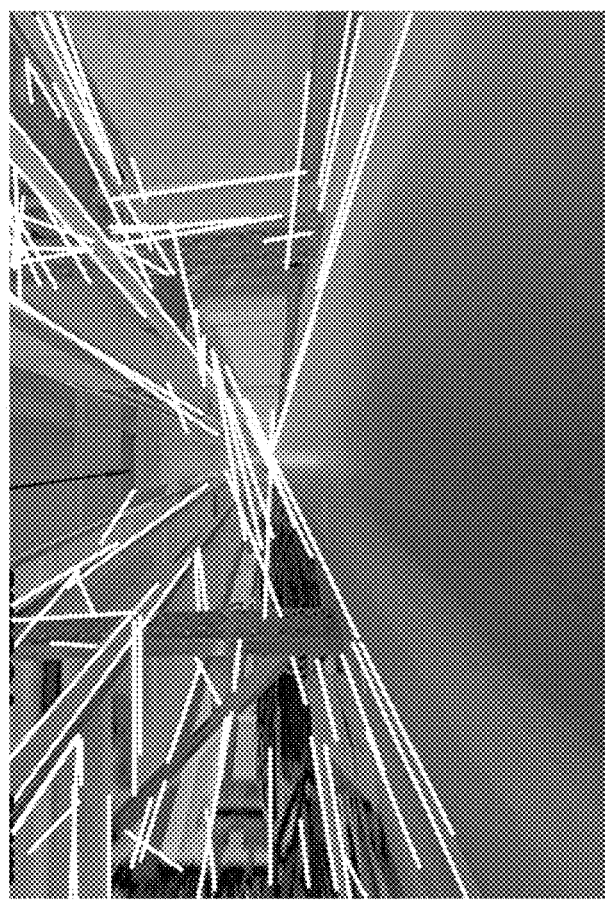
FIG. 7 illustrates superimposing a virtual cube on to an image/video frame.
Figure 7:
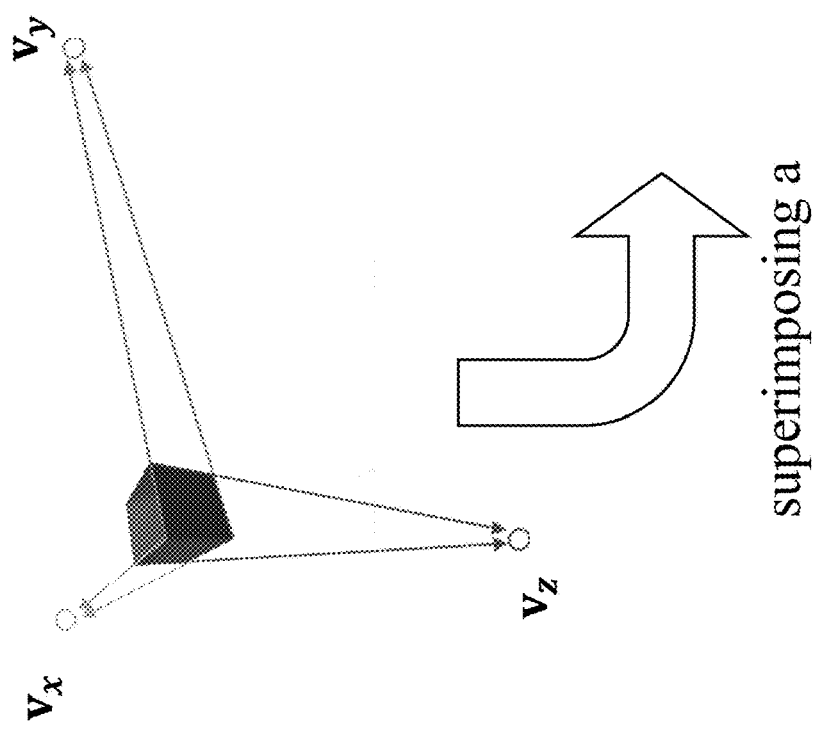

Continuing with step S40, the virtual cube is superimposed onto the video frame/image with line segments detected as shown in FIG. 7. The virtual cube is in an initial orientation represented by an initial 3×3 rotation matrix R. In one embodiment, the initial orientation is randomly selected. In another embodiment, the initial orientation is selected based on the last known position and orientation of front-facing camera 120, meaning the initial orientation is selected in a pre-defined range by best guess. The initial orientation with the rotation matrix R yields three orthogonal VPs: $v_x$, $v_y$ and $v_z$. Perpendicular distances of each detected line segment to all three orthogonal VPs are measured on the object image. In theory, it can be hypothesized that by extending the detected line segment in 3D space, it eventually converges to one of VP $v_x$, $v_y$ and $v_z$ in 2D image. As such the classification of the detected line segment depends on which of the VPs that it is expected to converge to.

Figure 8B:
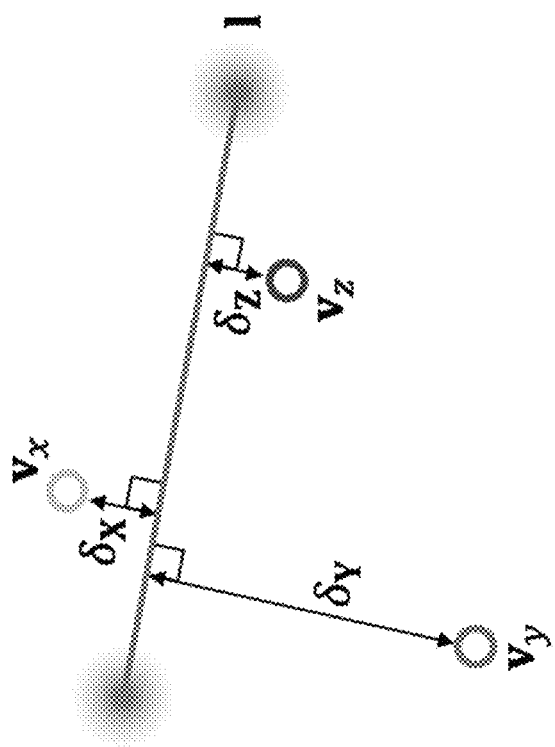
FIGS. 8A and 8B show two exemplary results of the line segment classification and grouping.
Figure 8A:
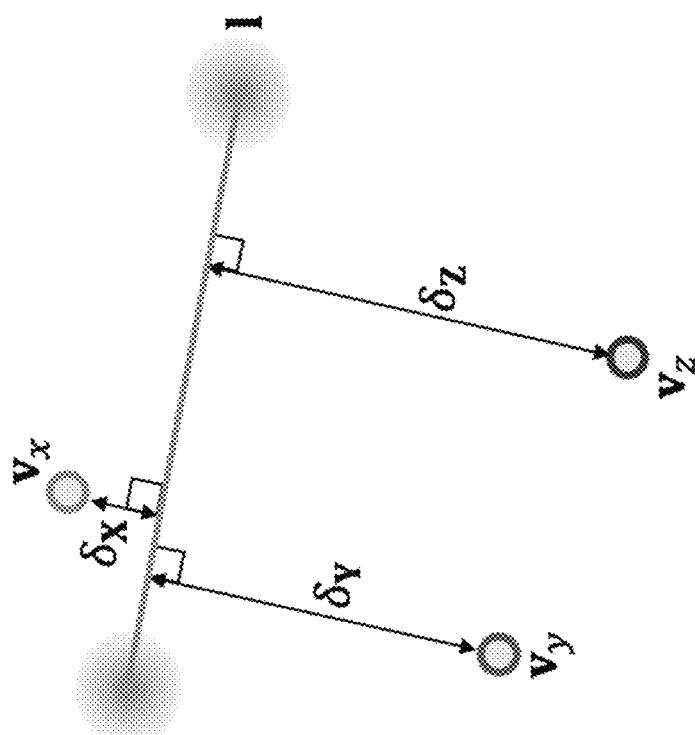

As illustrated in FIGS. 8A and 8B, a detected line segment is labelled l. Perpendicular distances from line l to the VPs $v_x$, $v_y$ and $v_z$ are labeled as $\delta_X$, $\delta_Y$, and $\delta_Z$, respectively. As shown in FIG. 8A, if line l is very close to $v_x$ and very far from both $v_y$ and $v_z$, $\delta_X$ is measured relatively very short and both $\delta_Y$ and $\delta_Z$ very long, meaning line l in the video frame/image is classified to be pointing toward the X direction in 3D space with high confidence, and consequently grouped into the X group. The same logic is applied in classifying and grouping other detected line segments into Y or Z groups. On the other hand, as shown in FIG. 8B, if line l approximate-equally close to more than one VPs (i.e. $v_x$ and $v_z$), line l cannot be classified and becomes an out-liner. Lastly, if line l is far away from all three VPs, line l cannot be classified and also becomes an out-liner.

In accordance to one embodiment, the line segment classification is computed using the following algorithm. Hypothesizing a line l to converge to one of VPs $v_x$, $v_y$ and $v_z$, the computation of the Sampson error $$\frac{\epsilon_i^2}{J_i \sum\limits_g J_i^\tau}$$

of the three hypotheses is equivalent to determining $\delta_X$, $\delta_Y$, and $\delta_Z$. Here, the computation of the Sampson error is based on defining distance $\delta_i$, where i is x, y, or z, in terms of the rotation matrix R as:

$$\text{distance } \delta_i = \frac{l_i^\tau K R P_i}{J_i \sum\limits_g J_i^\tau},$$

where $l_i=(p_i, q_i, 1) \times (u_i, v_i, 1)$ which is a line segment having two end points $(p_i, q_i)$ and $(u_i, v_i)$;

K=3×3 camera calibrated matrix;

R=3×3 rotation matrix;

$$P_i = \begin{cases} [0, 0, 1]^\tau & \text{for } l_i \text{ intersecting at } v_z \\ [0, 1, 0]^\tau & \text{for } l_i \text{ intersecting at } v_y; \text{ and} \\ [1, 0, 0]^\tau & \text{for } l_i \text{ intersecting at } v_x \end{cases}$$

where the denominator $J_i\Sigma_g J_i^\tau$ can be understood as pixel error of $l_i$, meaning the pixel noise level at both end of the object line segment.

Then, with the conditions of $\in_i = l_i^\tau KRP_i$, serving as scalar residual error, $\Sigma_g$=4×4 co-variances matrix of (p, q, u, v), and $J_i$=Jacobian of $\in_i$ w.r.t. g=(p, q, u, v), Sampson error is computed and $\delta_X$, $\delta_Y$, and $\delta_Z$ for each line segment are obtained. Using the Sampson error computation in the aforementioned first illustration as shown in FIG. 8A, since the Sampson error of $v_z$-hypothesis is relatively very small, but that of both $v_y/v_x$-hypotheses are very large, line 1 is classified as a Z group.

Step S40 can also be described as a qualitative computation with input parameters including an initial rotation matrix R, line segments $l_i$, camera calibrated matrix K, pixel noise co-variance $\Sigma_g$, an acceptance level α, and a rejection level β, where α=0.05 and β=0.95≥α for example. The objective is to classify line segments $l_i$ into X, Y, or Z group.

The step S40 qualitative computation comprises the following steps:

Step I: for each $l_i$, intermediate expressions as follows are computed:

$$\delta_i^Z = \frac{\epsilon_i^2}{J_i\sum_g J_i^\tau}\bigg|_{P_i=[0,0,1]^\tau}$$

$$\delta_i^Y = \frac{\epsilon_i^2}{J_i\sum_g J_i^\tau}\bigg|_{P_i=[0,1,0]^\tau}$$

$$\delta_i^X = \frac{\epsilon_i^2}{J_i\sum_g J_i^\tau}\bigg|_{P_i=[1,0,0]^\tau};$$

Step II: costs are sorted such that $\delta_i^{D_1} \leq \delta_i^{D_2} \leq \delta_i^{D_3}$ where $D_k$ is either Z, Y or X; and Step III: $l_i$ is classified into $D_1$ directional group if:

$\delta_i^{D_1} \leq F_1^{-1}(\alpha)$ and $\delta_i^{D_2} > F_1^{-1}(\beta)$, where $F_n$ is cumulative chi squared $\chi^2$ distribution with n degree of freedom. The determination condition in step III serves as a Hysteresis window to avoid line segments that are likely determined to be pointing to multiple directions.

Furthermore, the initial random orientation of the virtual cube may not be within a range of proximately correct orientations, and if the initial orientation is entirely incorrect, the classification may fail entirely. As such, multiple trial-and-error runs with multiple random initial orientations and rotation matrix R are needed. In one embodiment, the initial orientation and rotation matrix R of the trial-and-error run that yield the lowest number of out-liners are selected for the correct line segment classification and grouping generated there within.

After the classification and grouping, the video frame/image having the properly classified and grouped line segments in X, Y, Z is obtained, as shown in the right image of FIG. 5 as an example. The next step is the step S50, which is to estimate orthogonal VPs.

Figure 9:
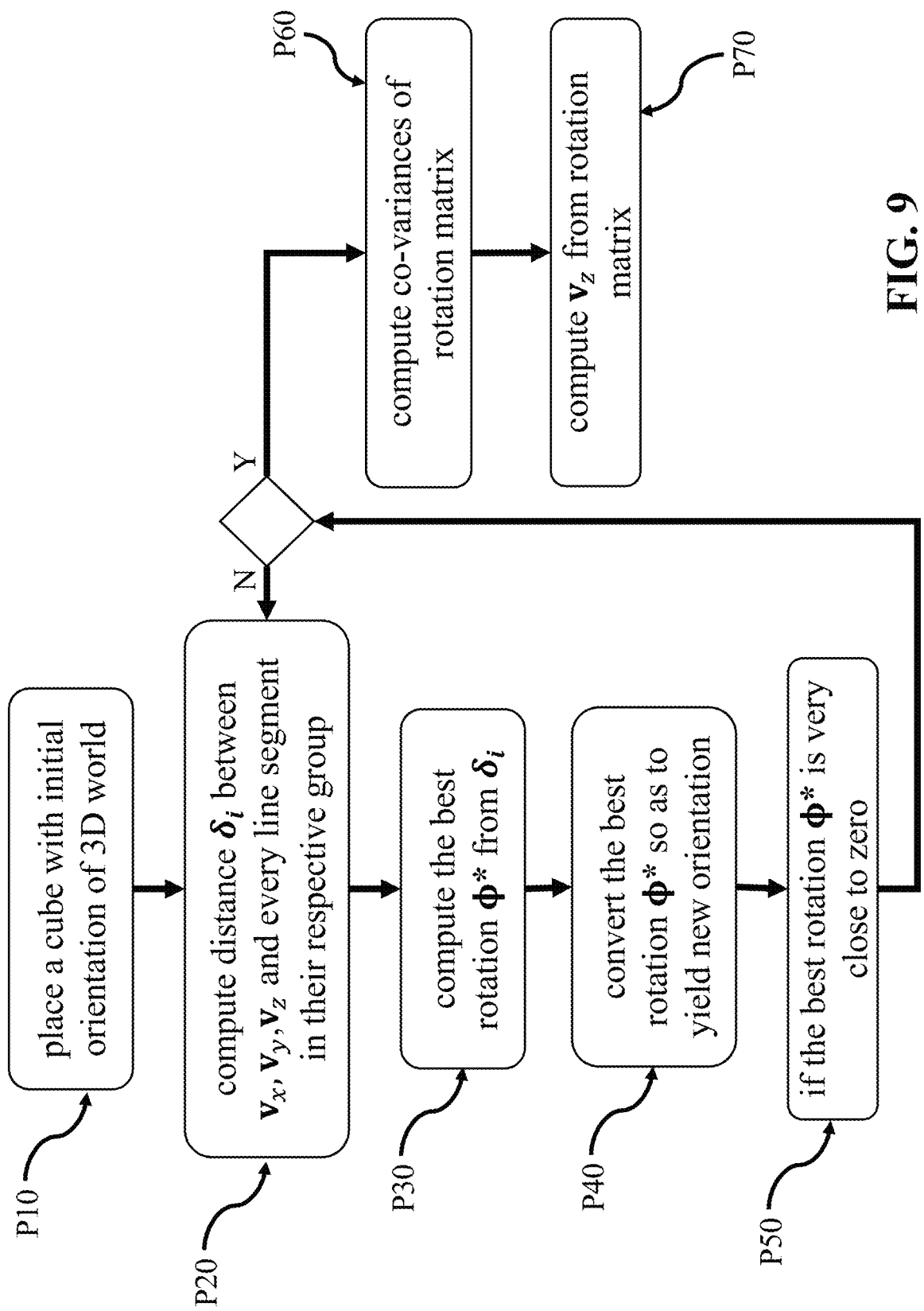
FIG. 9 depicts a flowchart of a method for estimating orthogonal vanishing points according to various embodiments of the present invention.
Figure 11:
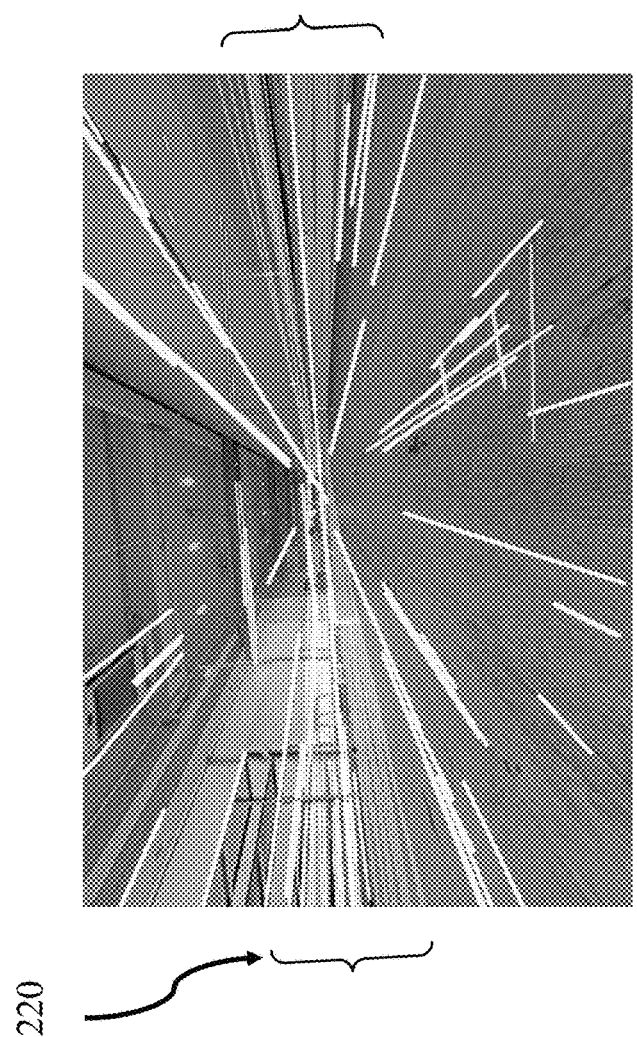
FIG. 11 illustrates the ground plane in a range of estimation error in an image/video frame.

Referring to FIG. 9. Step S50 comprises sub-steps P10-P70. In sub-step P10, a virtual cube with an initial orientation in 3D space that is represented by a 3×3 rotation matrix R (note that the rotation matrices in steps S40 and S50 can be same or different). Similar to the previous step S40, the initial orientation with rotation matrix R yields three orthogonal VPs $v_x$, $v_y$, and $v_z$. However, at least one difference between step S40 and step S50 is that since all line segments are already classified and grouped into X, Y, and Z groups, the virtual cube in the step S50 is first rotated to the best initial orientation (as shown in the right image of FIG. 5) such that $v_x$ is closest to all line segments in the X group; $v_y$ is closest to all line segments in the Y group; and $v_z$ is closest to all line segments in the Z group.

Figure 10:
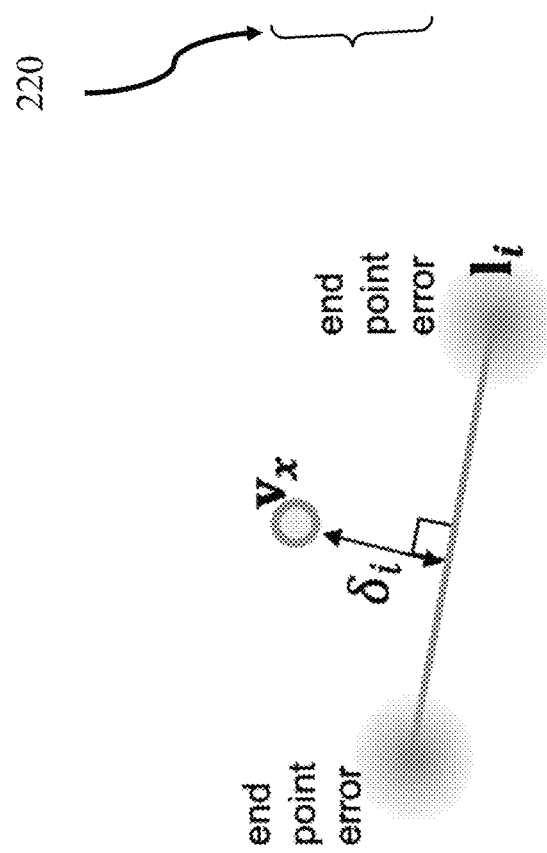
FIG. 10 illustrates the computation of a perpendicular distance between an orthogonal vanishing point and a line segment according to various embodiments of the present invention.

In sub-step P20, distances $\delta_i$ between VPs $v_x$, $v_y$, $v_z$ and every line segment in their respective groups are measured. For example, referring to FIG. 10, a distance $\delta_i$ between $v_x$ and a line $l_i$ of the X group is measured, where the distance $\delta_i$ is defined in terms of the rotation matrix R as aforementioned:

$$\text{distance } \delta_i = \frac{l_i^\tau KRP_i}{J_i\sum_g J_i^\tau}.$$

In the present step, linearized rotation matrix technique is further applied to approximating an infinitesimal rotational perturbation at the rotation matrix R as: $R'=(1-[\phi]_x)R$, $\phi$ is a three-vector Euler-angle. Such technique achieves low-complexity linear matrix computation. Note that for any three-vector $a=(a_1, a_2, a_3)$, it has:

$$[a]_x = \begin{bmatrix} 0 & -a_3 & a_2 \\ a_3 & 0 & -a_1 \\ -a_2 & a_1 & 0 \end{bmatrix}.$$

Then, since scalar residual error $\in_i = l_i^\tau KRP_i$ is related to the rotation matrix R, R' can be substituted into $\in_i$ such that the total Sampson error is expressed in terms of $\phi$, which yields the following expression.

$$J(\phi) = \sum_i \frac{\epsilon_i^2}{J_i\sum_g J_i^\tau}.$$

In sub-step P20, the total Sampson error is computed as equivalent to computing the distance $\delta_i$ between $v_x$, $v_y$, $v_z$ and every line segment in their respective group. A least square estimation (LSE) for the three orthogonal VPs $v_x$, $v_y$, $v_z$ is expressed as $$R^* = \underset{R}{\arg\min} \sum_i \frac{\epsilon_i^2}{J_i\sum_g J_i^\tau},$$

and the output for the expression may include the optimal orthogonal VPs $v_z^*$, $v_y^*$, $v_x^*$ and jointly as:

$v_z^* = KR^*[0,0,1]^\tau$;

$v_y^* = KR^*[0,1,0]^\tau$; and $v_x^* = KR^*[1,0,0]^\tau$.

In sub-step P30, an optimal three-vector Euler-angle $\phi^*$, which is also referred to as the best rotation, is computed from the total Sampson error. Since the total Sampson error $J(\phi)$ is a function of $\phi$, the minimum of $J(\phi)$ occurs at $\partial J(\phi)/\partial \phi = 0$ (i.e. in an orientation that rate of change of the total Sampson error is zero). As such, by solving the equation $\partial J(\phi)/\partial \phi = 0$, the optimal three-vector Euler-angle $\phi^*$ (i.e. the best or optimal orientation) is determined.

In sub-step P40, the optimal three-vector Euler-angle $\phi^*$ is converted to a 3×3 rotation matrix by $e^{[\phi]x}$, which is also referred to as a rotation matrix R", where $e^A$ is an exponential function of matrix A. The rotation matrix R" represents a new orientation. It should be noted that the yielded rotation matrix R" is different from the aforementioned rotation matrices R and R', and thus it is labelled by the different symbol.

In sub-step P50, an absolute value of the three-vector Euler-angle $\phi^*$ (i.e. $\|\phi^*\|$) is checked whether it is very close to 0. If it is very close to 0, the computation proceeds to sub-step P60. Otherwise, the computation reiterates from sub-step P20, and the yielded rotation matrix R" serves as input instead of the initial rotation matrix R generated in sub-step P10; and then a further 3×3 rotation matrix is obtained by executing sub-steps P20-P40 again.

In sub-step P60, co-variances of the yielded rotation matrix R" are also computed, which is equivalent to uncertainty in the yielded rotation matrix R" due to error of $l_i$.

In sub-step P70, the VP $v_z^*$ is computed by $v_z^* = KR^*[0,0,1]^\tau$. That is, the yielded rotation matrix R" serves as input for the computation of the VP $v_z^*$. In one embodiment, if iterative executions are performed (i.e. when the execution of sub-step P50 results in reiterating from sub-step P20 repeatedly), a 3×3 rotation matrix R eventually obtained to compute the ground orientation is expected to have the least total error trace ($\Sigma_\phi$).

Step S50 can also be described as a qualitative computation with input parameters including an initial rotation matrix $R_0$, three groups of line segments $l_i$ going through respectively $v_z$, $v_y$, $v_x$, a camera calibrated matrix K, and pixel noise co-variance $\Sigma_g$. The objective is to find R* such that $\Sigma_i \epsilon_i^2 / J_i \Sigma_g J_i^\tau$ is minimized and to find co-variance $\Sigma_\phi$ of R* in terms of Euler angles linearized at $R_0$.

The step S50 qualitative computation comprises the following steps:

Step I: a parameter R is initialized by using an initial rotation matrix $R_0$ as input (R←$R_0$);

Step II: intermediate expressions as follows are computed:

$$H_i^\tau = [P_i]_x R_0 K^\tau l_i;$$

$$\frac{\partial l_i}{\partial g} = \begin{bmatrix} 0 & 1 & 0 & 1 \\ -1 & 0 & 1 & 0 \\ q & -p & -v & u \end{bmatrix};$$

$$J_i = P_i^\tau R^\tau K^\tau \frac{\partial l_i}{\partial g};$$

$$w_i = J_i \sum_g J_i^\tau;$$

$$A = \sum_i H_i^\tau w_i H_i;$$

$$b = \sum_i H_i^\tau w_i \epsilon_i;$$

$$\phi = A^+ b,$$

$$R_\phi = R_0 e^{[\phi]_x} R_0^\tau;$$

where $A^+$ is pseudo inverse of A;

Step III: the parameter R is updated by using $R_\phi R$ as input (R←$R_\phi R$);

Step IV: determine whether to proceed to the next step of the computation: if $\|\phi\|$ is very close to 0, it is determined to proceed to the next step; otherwise, it returns to the step II; and Step V: a final-determination parameter R* is set by using the parameter R (R*←R), and co-variance $\Sigma_\phi$ of R* is computed, in which $\Sigma_\phi = A^+$.

In one embodiment, if $\|\phi\|$ is not very close to 0 or exceeds a preset threshold value, step I to step V are repeated by taking R* as input to set R in step I (R←R*) and reiterate the execution of the computation until $\|\phi\|$ is very close to 0.

Referring to FIG. 4 again. In step S60, with the obtained VP $v_z^*$, the ground normal n, which is a normal vector 90 degree to a ground plane, is computed by $n = K^{-1} v_z^*$. In one embodiment, multiple consecutive images or video frames are used in finding the most accurate ground normal n'. In this case, Steps S10 to S60 are executed in loops each on a image or video frame following the last captured in a sequence of, e.g. 30 images or video frames, or images or video frames captured during a pre-determined time period. In one embodiment, the initial 3D orientation of the virtual cube used in step S30 is randomly selected and different for each image or video frame in each of the looped executions. After the looped executions are completed, in one embodiment of step S70, the most accurate ground normal n' is determined by selecting the ground orientation having the least estimation error in response to the co-variances computed in step S50. In another embodiment, the most accurate ground normal n' is the convergence of all the ground normals obtained in the looped executions. The most accurate ground normal n' is then output to determine a ground plane in the video frame/image.

By the above processes, as the ground orientation is estimated from orthogonal VPs, camera orientation is correspondingly obtained. In the illustrative example above, none of the X, Y, and Z groups is empty. Nonetheless, embodiments of the present invention allow any one of the three groups to be empty (i.e. both X and Y groups contain at least one detected and classified line segment but the Z group is empty) because the computation in step S50 needs at least two of the three VPs being matched with the orientation of the virtual cube. Nevertheless, step S50 takes the advantage of having all three non-empty groups. It matches all three VPs to three groups and further reduces estimation error.

Figure 13:
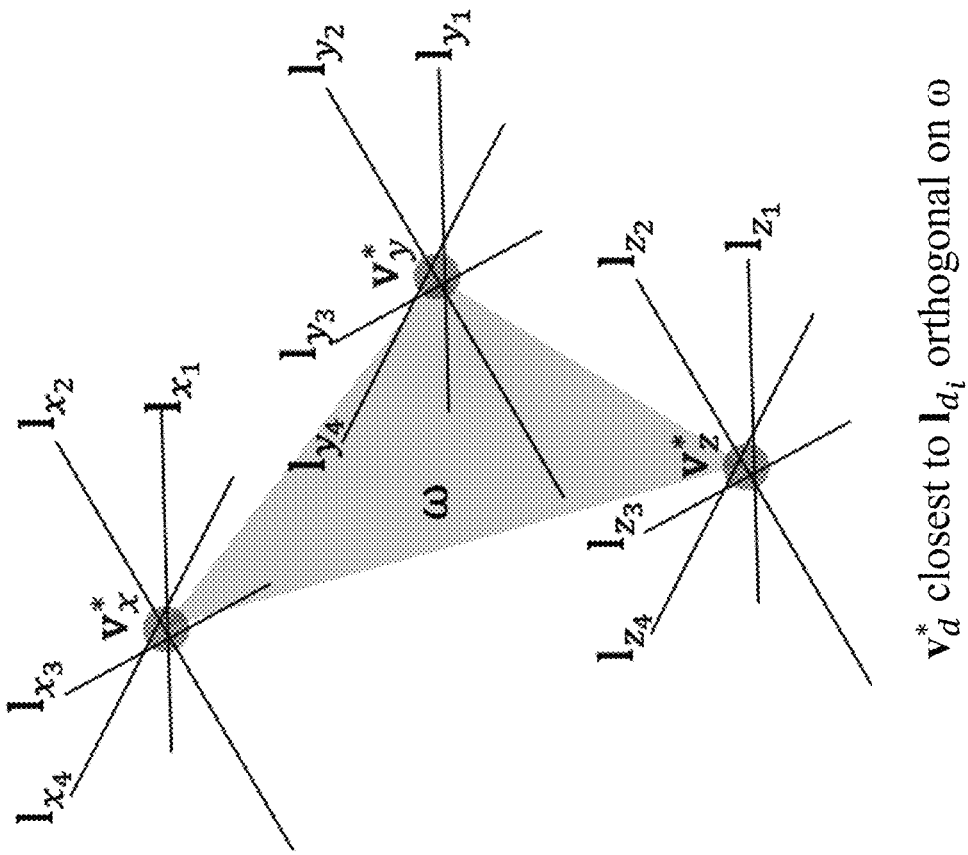
FIG. 13 illustrates the relationships between three vanishing points and the X, Y, and Z 3D plane line segment groups.
Figure 12:
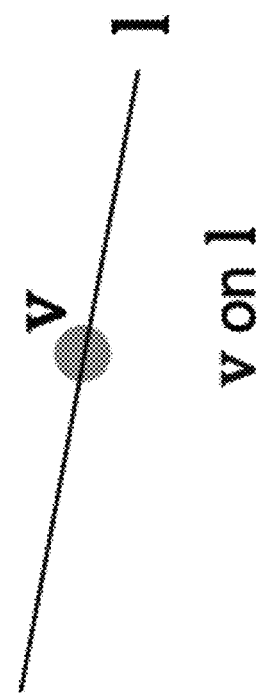
FIG. 12 illustrates an orthogonal vanishing point on a line segment.

Referring to FIG. 12. A point v is on a line segment l if and only if $l^\tau v = 0$. Referring to FIG. 13. Assuming a group of line segments $l_i$ for all i ($l_x$, $l_y$, $l_z$), the single common intersection point v* (either one of the $v^*_x$, $v^*_y$, $v^*_z$) closest to all line segments in the group in least square sense is:

$$v^* = \underset{v}{\operatorname{argmin}} \sum_i \|l_i^\tau v\|,$$

where $\|a\|$ is the norm of vector a.

Further, assuming three group of line segments $l_{x_i}$, $l_{y_j}$, $l_{z_k}$, their three respective least square intersection points $v_x^*$, $v_y^*$, $v_z^*$ are:

$$v_x^* = \underset{v_x}{\arg\min} \sum_i \|l_{x_i}^r v_x\|,$$

$$v_y^* = \underset{v_y}{\arg\min} \sum_j \|l_{y_j}^r v_y\|, \quad (1)$$

$$v_z^* = \underset{v_z}{\arg\min} \sum_k \|l_{z_k}^r v_z\|$$

To enforce the orthogonality among $v_x^*$, $v_y^*$, $v_z^*$, and avoid 0 trivial solutions, the minimization above are constrained by: $v_x^* \tau \omega v_y^* = 0$, $v_y^* \tau 107 \, v_z^* = 0$, $v_z^* \tau \omega v_x^* = 0$, $\|v_x^*\| = 1$, $\|v_y^*\| = 1$, $\|v_z^*\| = 1$. In a case where i.e. group $l_{z_k}$ is empty, it is still possible to compute $v_z$ from $v_x^*$, $v_y^*$ by the orthogonality constraint. Therefore, a ground plane is estimated where there is no e.g. vertical structure in a video frame/image. Moreover, $v_z^*$ is estimated from all groups of lines $l_{x_i}$, $l_{y_j}$, $l_{z_k}$, instead of only from group $l_{z_k}$, such that error uncertainty in $v_z^*$ is reduced further, which in turn solves the problem of difficult estimation of Z VP in a front-facing camera.

On the other hand, it is difficult to solve the quadratic least square minimization problem with six quadratic equality constraints such as those presented in above equation (1). In this regard, the present invention provides a solution, presented below, to circumvent the quadratic equality constraints by rotation.

Basis directions in $\mathbb{E}^3$ are defined as $X=[1,0,0]$, $Y=[0,1,0]$ and $Z=[0,0,1]$, and their VPs are imaged by a camera calibrated matrix K as:

$$q_x = KX, \; q_y = KY, \; q_z = KZ \quad (2).$$

Since $v_x^*$, $v_y^*$, $v_z^*$ and $q_x$, $q_y$, $q_z$ are on the plane at infinity, there exists a projective transformation H* such that $$v_d^* = H^* q_d \text{ for } d \text{ being } x, y \text{ and } z \quad (3).$$

A simple check reveals $v_x^*$, $v_y^*$, $v_z^*$ are orthogonal on $\omega = K^{-\tau} K^{-1}$. Because H* transforms points on the plane at infinity, the "infinite homography" property is applied herein, such that:

$$H^* = KR^* K^{-1}, \text{ where } R^* \text{ is a rotation matrix} \quad (4).$$

Accordingly, by substituting equations (2), (3), and (4) into the equation (1), the least square intersection points problem for three line-segment groups $l_{x_i}$, $l_{y_j}$, $l_{z_k}$ for all i, j, k becomes:

$$R^* = \left( \sum_i \|l_{x_i}^r KRX\| + \sum_j \|l_{y_j}^r KRY\| + \sum_k \|l_{z_k}^r KRZ\| \right).$$

As such, the six quadratic equality constraints are eliminated and transformed to depend upon only one rotation matrix constraint. Furthermore, it explains the definition of distance $\delta_i$ as being related to "$l_i^\tau KRP_i$" and is effective to estimate camera orientation.

Therefore, by leveraging the property of orthogonal VPs, camera orientation is automatically estimated by analyzing sense structure. The core algorithm is properly established on a least square optimization approach, enabling the error uncertainty on camera orientation to be computed.

Figure 14:
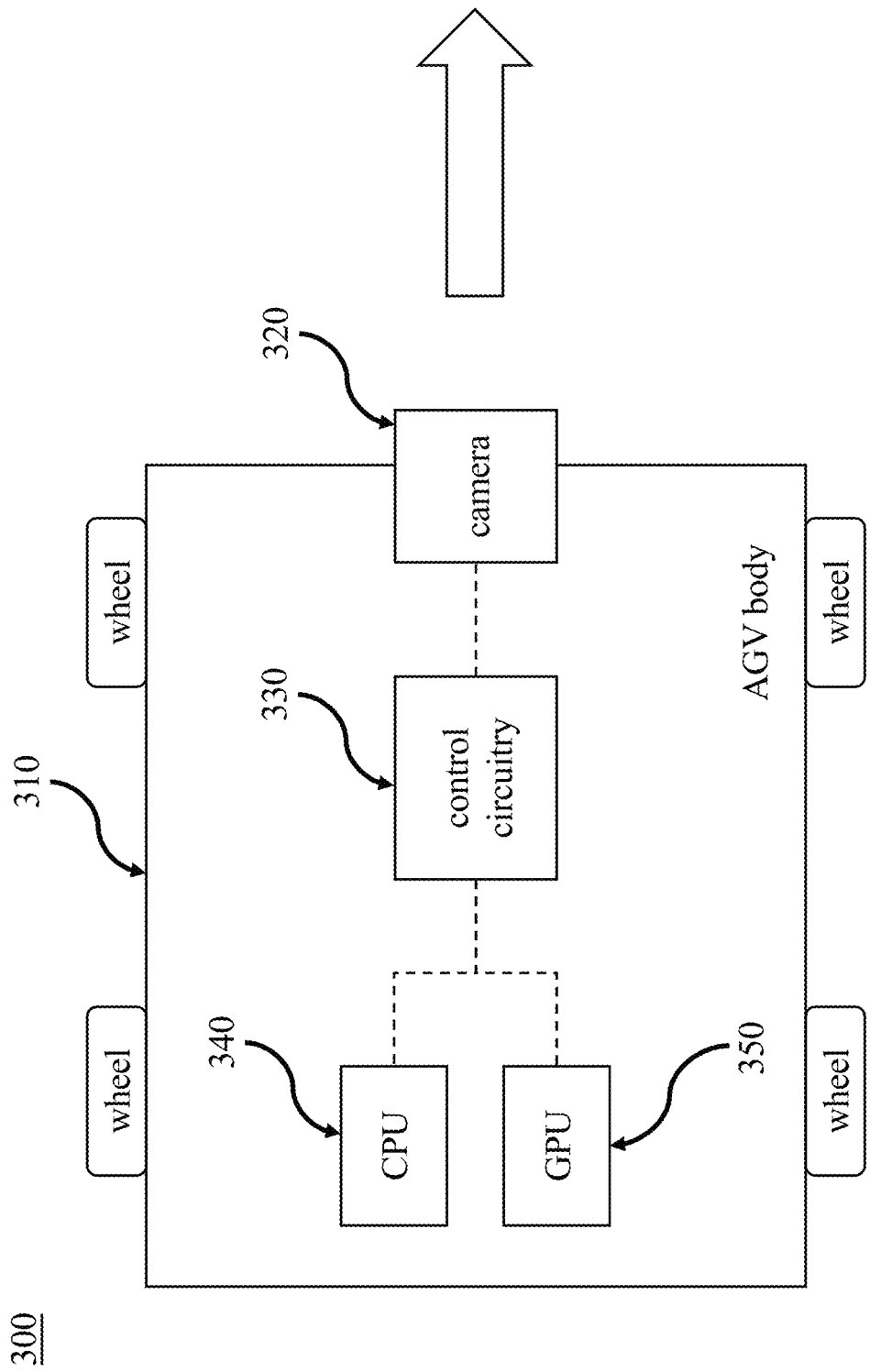
FIG. 14 depicts a schematic diagram of another exemplary embodiment of an AGV.

FIG. 14 depicts a schematic diagram of another exemplary embodiment of an AGV 300 according to applications of various embodiments of the present invention. The configuration of the present embodiment is similar or identical to that as afore-described, but with at least one difference in that the AGV 300 of the present embodiment further include local CPU 340 and GPU 350 for fully localized machine vision computation in lieu of relying on that by a remote processing server.

The control circuitry 330 is electrically coupled with the front-facing camera 320, the CPU 340, and the GPU 350. The control circuitry 330 is configured to transmit a video file recorded by the front-facing camera 320 to the CPU 340 and the GPU 350 for estimating camera orientation. The configuration of the present embodiment enables the AGV 300 for being a street vehicle or commercial/domestic robots.

Although the above description of the present invention involved only ground-based AGVs, an ordinarily skilled person in the art can readily adapt and apply the various embodiments of the present invention in other machine vision applications in e.g. aerial and marine-based drones without undue experimentation or deviation from the spirit of the present invention.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure.

Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAIVIs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for estimating camera orientation of a front-facing camera, comprising:
recording a first image of a scene before the front-facing camera;
determining a ground plane on the first image, comprising:
detecting a plurality of line segments in the scene in the first image;
superimposing a first virtual cube having three orthogonal vanishing points on to the first image, wherein the first virtual cube being in a first three-dimensional (3D) orientation;
classifying and grouping the line segments of the first image into a first, a second, and a third 3D-directional groups by comparing and identifying a shortest among perpendicular distances between each of the three orthogonal vanishing points of the first virtual cube and each of the detected line segments, respectively;
superimposing a second virtual cube on to the first image, wherein the second virtual cube has three orthogonal vanishing points on the first image, wherein the second virtual cube being in an initial 3D orientation represented by an initial rotation matrix $R_0$;
computing an optimal 3D orientation of the second virtual cube with respect to the line segment groups by iteratively changing the 3D orientation of the second virtual cube and measuring perpendicular distances of the three orthogonal vanishing points to the three line segment groups in each iteration starting with the initial 3D orientation, wherein the optimal 3D orientation of the second virtual cube being one that provides shortest perpendicular distances;
computing co-variances of the three orthogonal vanishing points of the second virtual cube at the optimal orientation;
computing ground orientation from one of the three orthogonal vanishing points of the second virtual cube at the optimal orientation; and
determining the ground plane on the first image according to the ground orientation and determining an estimation error in response to the co-variances; and
estimating the camera orientation of the front-facing camera from the determined ground plane on the first image.

2. The method of claim 1, wherein the first 3D orientation of the first virtual cube is randomly selected.

3. The method of claim 1, wherein the first 3D orientation of the first virtual cube is a best-guess selection based on last known position and orientation of the front-facing camera.

4. The method of claim 1, further comprising:
recording a second image of a scene before the front-facing camera following the first image;
taking the optimal orientation of the second virtual cube as input to determine a ground plane on the second image; and
estimating the camera orientation of the front-facing camera from the determined ground plane on the second image.

5. The method of claim 1, further comprising:
repeatedly recording subsequent N number of images of a scene before the front-facing camera;
for each of subsequent images, determining a ground plane on the first image, wherein the first image is the subsequent image; and
selecting a most accurate ground plane among the determined ground planes of the subsequent images, wherein the most accurate ground plane corresponds to the computed ground orientation having the least estimation error in response to the co-variances; and
estimating the camera orientation of the front-facing camera from the most accurate ground plane.

6. The method of claim 1, wherein the three orthogonal vanishing points of the first virtual cube are computed by using the pre-determined camera calibrated matrix; and
wherein the classifying and grouping the detected line segments of the first image comprises:
obtaining three reference values between the three orthogonal vanishing points of the first virtual cube and an object line segment, wherein the three reference values are related to vertical distances between the three orthogonal vanishing points of the first virtual cube and every line segment, respectively; and
grouping the object line segment into one of the first, second, and third groups when only one of the reference values is below an acceptance threshold and the rest are above a rejection threshold.

7. The method of claim 1, wherein the three orthogonal vanishing points of the second virtual cube are computed by using the pre-determined camera calibrated matrix; and
wherein computing the optimal orientation of the second virtual cube with respect to the grouped line segments comprises:
applying an infinitesimal rotational perturbation to the initial rotation matrix $R_0$ by using an Euler-angle $\phi$, so as to derive a function of the Euler-angle $\phi$;
taking pixel noise level at both end of an object line segment as input to the function of the Euler-angle $\phi$, so as to obtain a Sampson error distance formula expressing relationships between the object line segment and the three orthogonal vanishing points of the second virtual cube;
computing a target Euler-angle $\phi^*$ such that rate of change of the function of the Euler-angle $\phi$ with substituting the target Euler-angle $\phi^*$ is 0; and
using the target Euler-angle $\phi^*$ to compute the optimal orientation of the second virtual cube.

8. The method of claim 7, wherein computing the optimal orientation of the second virtual cube with respect to the grouped line segments is an iterative algorithm such that an absolute of the target Euler-angle $\phi^*$ converges to close to zero.

9. The method of claim 7, wherein computing the target Euler-angle $\phi^*$ such that the rate of the change of the function of the Euler-angle $\phi$ with substituting the target Euler-angle $\phi^*$ is 0 comprises:
computing $\phi^* = A^+ b$, where $$H_i^T = [P_i]_x R_0 K^T l_i;$$

$$\frac{\partial l_i}{\partial g} = \begin{bmatrix} 0 & 1 & 0 & 1 \\ -1 & 0 & 1 & 0 \\ q & -p & -v & u \end{bmatrix};$$

-continued $$J_i = P_i^T R^T K^T \frac{\partial l_i}{\partial g};$$

$$w_i = J_i \sum_g J_i^T;$$

$$A = \sum_i H_i^T w_i H_i;$$

$$b = \sum_i H_i^T w_i \epsilon_i;$$

$l_i=(p_i, q_i, 1)\times(u_i, v_i, 1)$ which is the object line segment between two end points $(p_i, q_i)$ and $(u_i, v_i)$;

K is the camera calibrated matrix;

R is set by using the initial rotation matrix $R_0$ as input;

$$P_i = \begin{cases} [0, 0, 1]^T & \text{for } l_i \text{ intersecting at } v_z \\ [0, 1, 0]^T & \text{for } l_i \text{ intersecting at } v_y; \\ [1, 0, 0]^T & \text{for } l_i \text{ intersecting at } v_x \end{cases}$$

$v_z$, $v_y$, $v_x$ are the three orthogonal vanishing points of the second virtual cube;

$\epsilon_i = l_i^T K R P_i$; and $\Sigma_g$ is the pixel noise level at the both end of the object line segment.

10. The method of claim 7, further comprising converting the target Euler-angle $\phi^*$ to a rotation matrix to act on the second tube.

11. The method of claim 1, wherein computing the ground orientation comprises:
taking a resulted rotation matrix R* representing the optimal orientation of the second virtual cube as input to compute a ground normal vector n of the ground orientation as n=R*$[0,0,1]^T$.

12. The method of claim 1, wherein detecting the plurality of line segments from the first image comprises:
converting the first image in RBG into a 2D array containing only zeros and ones, using Canny edge detection; and
detecting the line segments from the 2D array using statistical Hough transform.

13. A method for guiding a vehicle having a front-facing camera, comprising:
executing a method for estimating camera orientation of the front-facing camera of claim 1; and
controlling motions of the vehicle by a remote processing server in response to the estimated camera orientation.

14. A remote processing server for estimating camera orientation of front-facing camera of an autonomous guided vehicle (AGV), comprising:
a processor in data communication with an AGV;
wherein the processor is configured to receive a video file or data stream from the AGV and to execute the method for estimating camera orientation of claim 1 with respect to the front-facing camera of the AGV.

15. An autonomous guided vehicle (AGV), comprising:
a front-facing camera installed at a front side of the AGV body and configured to capture a scene before the AGV;
a processor configured to receive a video file or data stream from the front-facing camera and to execute the method for estimating camera orientation of claim 1 with respect to the front-facing camera of the AGV.

* * * * *